United States Patent
Rizzi et al.

(10) Patent No.: US 8,906,527 B2
(45) Date of Patent: Dec. 9, 2014

(54) MULTI-LAYER COMPOSITE GETTER

(75) Inventors: Enea Rizzi, Milan (IT); Alessandra Fernicola, Lainate MI (IT); Paolo Vacca, Milan MI (IT)

(73) Assignee: Saes Getters S.p.A., Lainate (IT)

( * ) Notice: Subject to any disclaimer, the term of this patent is extended or adjusted under 35 U.S.C. 154(b) by 0 days.

(21) Appl. No.: 13/879,001

(22) PCT Filed: Nov. 10, 2011

(86) PCT No.: PCT/EP2011/069819
§ 371 (c)(1),
(2), (4) Date: Apr. 11, 2013

(87) PCT Pub. No.: WO2012/069320
PCT Pub. Date: May 31, 2012

(65) Prior Publication Data
US 2013/0202921 A1  Aug. 8, 2013

(30) Foreign Application Priority Data
Nov. 23, 2010  (IT) .......................... MI2010A002160

(51) Int. Cl.
| | |
|---|---|
| *H01M 10/52* | (2006.01) |
| *H01G 9/02* | (2006.01) |
| *H05K 5/06* | (2006.01) |
| *B32B 15/08* | (2006.01) |
| *C01B 3/00* | (2006.01) |
| *C01B 3/50* | (2006.01) |

(52) U.S. Cl.
CPC ............. *C01B 3/0084* (2013.01); *C01B 3/0078* (2013.01); *C01B 3/508* (2013.01); *H01G 9/02* (2013.01); *H01M 10/52* (2013.01); *Y02E 60/327* (2013.01)

USPC .............. 429/57; 361/502; 361/518; 428/626

(58) Field of Classification Search
None
See application file for complete search history.

(56) References Cited

U.S. PATENT DOCUMENTS

| | | | |
|---|---|---|---|
| 2009/0215610 A1* | 8/2009 | Kullberg et al. ................. | 502/56 |
| 2009/0225496 A1* | 9/2009 | Toia et al. ...................... | 361/503 |
| 2014/0106355 A1 | 4/2014 | Bangert et al. | |

FOREIGN PATENT DOCUMENTS

| | | |
|---|---|---|
| WO | 03028096 | 4/2003 |
| WO | 2006/089068 | 8/2006 |
| WO | 2007/066372 | 6/2007 |
| WO | 2007/080614 | 7/2007 |
| WO | 2008/033560 | 3/2008 |
| WO | 2008/148778 | 12/2008 |
| WO | 2008/148781 | 12/2008 |
| WO | 2010/136364 | 12/2010 |
| WO | 2012/159822 | 11/2012 |

OTHER PUBLICATIONS

PCT International Search Report mailed on Dec. 12, 2011 for PCT/EP2011/069819 filed on Nov. 10, 2011 in the name of Saes Getters Spa.
PCT International Written Opinion mailed on Dec. 12, 2011 for PCT/EP2011/069819 filed on Nov. 10, 2011 in the name of Saes Getters Spa.

* cited by examiner

*Primary Examiner* — Sarah A Slifka
(74) *Attorney, Agent, or Firm* — Steinfl & Bruno, LLP

(57) ABSTRACT

A multi-layer composite getter is described. Also described is a method for the manufacturing of the multi-layer composite getter and electrochemical devices for energy storage that employ the multi-layer composite getter.

28 Claims, 3 Drawing Sheets

MULTI-LAYER COMPOSITE GETTER

CROSS REFERENCE TO RELATED APPLICATIONS

The present application is the US national stage of International Patent Application PCT/EP2011/069819 filed on Nov. 10, 2011 which, in turn, claims priority to Italian Patent Application MI2010A002160 filed on Nov. 23, 2010.

SUMMARY

The present invention relates to an improved multi-layer composite getter, a method for its manufacturing and to electrochemical devices for energy storage that employ said multi-layer composite getters.

The use of getter materials for the removal of gaseous impurities has found application in many fields, such as process chambers for semiconductor devices, purification of process gases and pumping members for evacuated chambers. However, one of the fields in which the use of getter materials is particularly appreciated is that of the removal of harmful species from the internal volume of hermetic or sealed devices, wherein the presence of these harmful species jeopardizes the operation of the device.

In this case, the mechanisms that compromise the functionality of the device are essentially of two types, the first one of which is due to a chemical interaction of the harmful species with one or more components of the device, which interaction alters the properties of said components, thus jeopardizing their functionality. Examples of these interactions may be, among others, a loss of transparency for optical devices or a degradation of the electrical characteristics of the components by altering their resistivity and thus their functionality. In this first case it is very important that the concentration of harmful species, typically in the form of gases, is as low as possible.

A second degradation mechanism is instead associated with the risks of breaking the device due to an excessive pressurization; this problem is present in the devices in which the harmful species are mainly in a gaseous form and their production is associated with the operation of the device itself In this case risks of mechanical breakage of the container, and thus also safety problems, are associated with a malfunction of the device.

This problem is particularly felt in the field of electrochemical devices for energy storage, nowadays generally known in the field as energy storage devices.

In the wide range and variety of electrochemical devices for energy storage three very important large families may be identified: rechargeable batteries, with particular reference to lithium batteries; electrolytic capacitors, with particular reference to those known in the field as "aluminum capacitors"; and "supercapacitors". In the technical field, the main difference between the two latter categories of devices previously listed resides in the different order of magnitude of the accumulated capacity. In particular, in the case of electrolytic capacitors of small size the capacity is in the order of microfarad (µF), whereas in the case of supercapacitors the capacity may also be 10,000 times higher.

The problem of the presence of gaseous impurities within these devices has been tackled in various ways. For example the published patent applications WO 2007/066372 and WO 2008/148778, both in the applicant's name, employed polymeric multi-layer systems with the getter material dispersed in a suitable polymer and shielded from the contact and the interaction with the electrolyte by means of a protective polymeric layer permeable to the harmful species but impermeable to the electrolyte.

Another solution, described in patent applications WO 2007/080614 and WO 2008/148781, both in the applicant's name, teaches the use of getter materials enclosed in a polymeric container permeable to the harmful species but impermeable to the electrolyte.

Finally, patent application WO 2008/033560, also in the applicant's name, exploits a completely different approach and describes the use of metal getter multi-layers for removing hydrogen from electrochemical devices for energy storage, with particular reference to the use of materials comprising an external layer made of a noble metal.

The latter solution seems, and is so considered in the field, better than the previous ones with reference to the removal of $H_2$ because the use of polymeric multi-layers necessarily limits the amount of getter material that can be used and therefore, on equal volume occupied by the getter material, results in a lower capacity. Moreover, the solutions according to which the getter material is enclosed in a polymeric container have proved to be inherently fragile, in particular at the junction areas of the container. In addition to these problems, there is also the fact that according to the first two solutions the presence of the polymeric layer generally slows down hydrogen sorption, whereas the multi-layer metal getter, which is described as such in the International publication WO 2006/089068 in the applicant's name, has characteristics that were considered to make it compatible with the application.

In particular, although this solution is very effective in the removal of hydrogen under normal conditions of use within electrochemical devices for energy storage, it has surprisingly shown unexpected drawbacks under some particular use conditions in which the materials intended to remove hydrogen have become themselves gas sources, thus leading to the device breakage.

The main condition leading to this reverse behavior in electrolytic capacitors and in particular in the aluminum capacitors is the presence of a flow of current having reversed polarity with respect to the normal operation. This situation may result from a human error during the connection and installation of the device, with a significant associated safety risk due to the large amounts of gas that may be generated in a short time, or when the inner temperature of the device exceeds the nominal temperature of the capacitor, which is typically defined in the field as "rated temperature" of the device, since in this case secondary alternating currents are generated, defined in the field as "ripple currents", whose inverse component is the one which is harmful to the device. More references and details can be found in various publications such as the book Electronic Fundamentals & Applications, published in 1970. The intensity of the phenomenon, and thus the associated gas generation, is directly proportional to temperature; in particular this starts to be significant when the temperature of the device exceeds the specified rated temperature by 5%.

This kind of problem has been effectively solved thanks to the teaching of the international patent application PCT/EP2010/056872, in the applicant's name, which discloses a multi-layer getter system wherein on at least one of the surfaces of the getter material a protective layer made of palladium or palladium-based composite materials is deposited, and wherein a protective polymeric layer permeable to hydrogen is provided on at least 80% of the surface area of its surface or surfaces being coated with palladium or composites thereof.

It is an object of the present invention to overcome the drawbacks still present in the prior art with reference to multi-layer metal getter materials or, as in the case of the teaching disclosed in PCT/EP2010/056872 to improve the characteristics of multi-layer metal getter materials, with particular but non-exclusive reference to their use in electrochemical devices for energy storage.

In a first aspect thereof the invention is a multi-layer composite getter for hydrogen removal comprising a support essentially formed of a metal getter material with two surfaces, wherein a first layer of palladium or palladium based composites is provided on at least one of said surfaces defining a coated surface, wherein a hydrogen-permeable protective polymeric layer is provided on at least 80% of the surface of the coated surface, characterized in that one or more auxiliary getter materials are dispersed in said hydrogen-permeable protective polymeric layer with a weight concentration comprised between 5 wt % and 50 wt %, calculated on the overall weight of the polymeric layer containing the auxiliary getter material.

The weight concentration of the auxiliary getter materials in the polymeric protective layer is preferably comprised between 15 wt % and 30 wt %.

With the wording "auxiliary getter materials" it is meant to better indicate the presence of additional getter materials with respect to the getter layer serving as a support for the multi-layer composite getter according to the present invention, whereas the wording "palladium-based composite materials" indicates materials containing at least 60 wt % of palladium. Preferred palladium composites are palladium-vanadium, palladium-nickel compounds and even more preferred are palladium-copper or palladium-silver compounds. In an even more preferred embodiment the palladium composites are in the form of alloys.

BRIEF DESCRIPTION OF THE DRAWINGS

The invention will be better described in the following with reference to the drawings, wherein.

Figure 1:
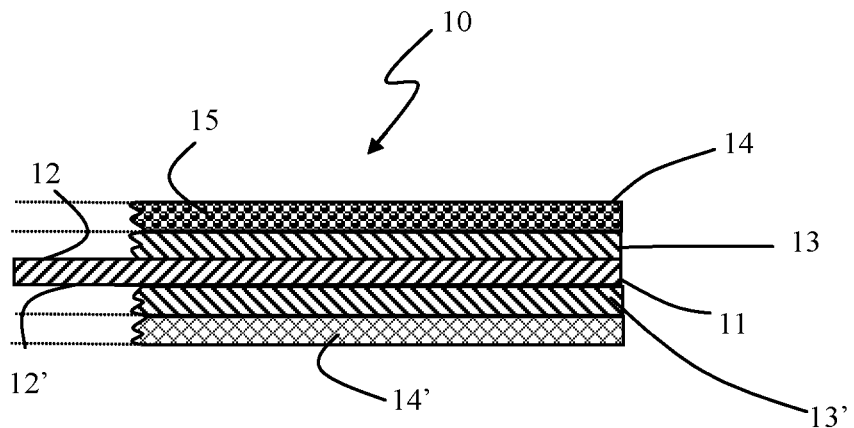
FIG. 1 shows a broken view of a multi-layer composite getter according to the present invention.

In the drawings the size and dimensional ratios of some components, with particular but non-exclusive reference to the thicknesses of the layers forming the multi-layer composite getter, have been altered in order not to compromise the reading of the drawings.

DETAILED DESCRIPTION

Thanks to the modification described in the present invention with respect to the disclosure of the international application PCT/EP2010/056872, due to the presence of auxiliary getter materials dispersed therein, the polymeric membrane has also an active role in the removal of gaseous species that are harmful for the operation of the device. In particular, it is very advantageous to functionalize the membrane in order to make it sorb harmful species other than hydrogen, such as e.g. $H_2O$ and $CO_2$, thus providing the multi-layer getter system with additional functions.

In particular, the presence of $H_2O$ is harmful in those electrochemical devices, in which the electrolyte is not made of an aqueous solution, such as supercapacitors and batteries, wherein the presence of water, even in amounts of the order of 20-50 ppm may significantly alter the electrical characteristics of the device. Another particularly relevant case is that of the electrolytic capacitors, with particular reference to "aluminum capacitors", wherein the amount of water initially present in the electrolyte tends to increase during the use of the device because it is produced by degradation and ageing reactions of the electrolyte itself. Water production alters the electrical characteristics of the device. As to $CO_2$, the harmful effects of its presence inside hermetic devices such as electrochemical devices are similar to those related to the presence of hydrogen, i.e. the presence of $CO_2$ may create or contribute to create overpressure conditions inside the device, resulting in the previously discussed drawbacks and risks.

FIG. 1 shows an improved multi-layer composite getter 10 made according to the present invention, wherein on both the available surfaces 12, 12' of the layer 11 made of metal getter a layer 13, 13' of palladium or palladium-based composite is provided with a protective layer 14, 14' of a hydrogen-permeable polymeric material provided thereon.

The metal getter layer 11 serves as a support for the other layers and due to this aspect in some alternative embodiments it is possible that the layer of palladium or palladium-based composites and the polymeric layer thereon are not present along the whole surface of the getter layer. In this case it is important that the layer of palladium or palladium-based composites covers at least 20% of the surface area of the getter material layer.

Anyway it is of critical importance the fact that the protective polymeric layer covers at least 80% of the overall metallic surface of the multi-layer getter system, intended as a portion of the getter material surface area not covered by palladium or palladium-based composites and surface area of palladium or palladium-based composites.

It is important to remark that in this embodiment that has two coatings of palladium or palladium composites on the two possible surfaces of the support made up of the getter material 11, the surfaces being indicated by surfaces 12 and 12', the external polymeric membranes may have different characteristics. For instance, in the embodiment shown in FIG. 1 the membrane 14 contains powders of an auxiliary getter material 15, whereas the membrane 14' contains no auxiliary getter material.

Other alternative embodiments may be so configured that the membrane 14 contains powders of various auxiliary getter materials, and the auxiliary getter materials contained in the membranes 14 and 14' might be the same or different from each other, so as to provide the membranes with a selective behavior or to make them suitable to remove a specific harmful species.

Figure 2:
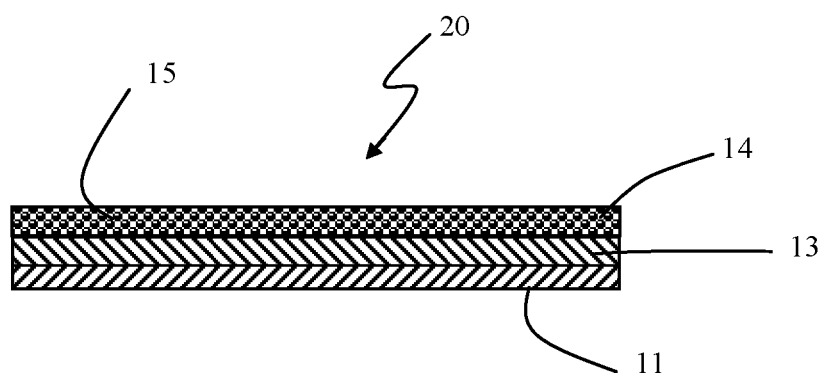
FIG. 2 shows an alternative embodiment of the multi-layer composite getter according to the present invention.

An alternative embodiment 20 is shown in FIG. 2, wherein the layer 13 made of palladium or palladium-based composites, with the polymeric material layer 14 lying thereon and having an auxiliary getter material dispersed therein, is provided on only one of the surfaces of the supporting getter layer 11. Also in this case the auxiliary getter material is shown as a discrete getter material in a particulate form. The same considerations previously described with reference to the possible reduced surface area of the layer of palladium or palladium-based composites also apply in this case. In particular, in this embodiment it is preferred that the protective polymeric layer containing the getter material covers at least 80% of the surface area of solely the surface coated with palladium or palladium-based composites. In this case in fact the multi-layer composite getter is typically employed by arranging the non-coated surface against a wall of the device, that in this way acts as a shield, thus protecting the getter material and making further coatings superfluous and not necessary on the surface contacting the wall of the hermetic/sealed device.

Figure 3:
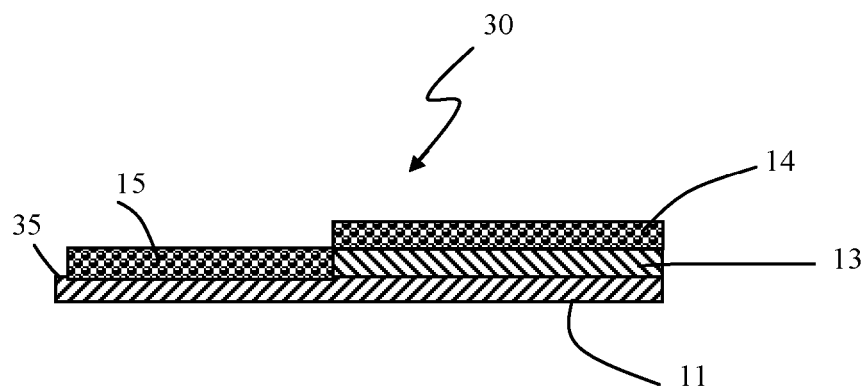
FIG. 3 shows a third embodiment of the multi-layer composite getter according to the present invention.

A further variant 30 of this embodiment is shown in FIG. 3, where in this case it is explicitly shown that a small part 35 of the available metallic surface area of the getter material is not coated by the polymeric layer 14, that contains an auxiliary getter material 15, also in this case shown in a discrete form as a dispersed particulate.

In the present invention it is important that the hydrogen-permeable polymeric material layer containing the auxiliary getter material coats at least 80% of the metallic surface exposed to the inner atmosphere of the device, where the multi-layer getter system is installed.

Preferably the permeability to hydrogen of the protective polymeric layer is equal to or higher than $10^{-12}$ cm$^3$ cm cm$^{-2}$ s$^{-1}$ Pa$^{-1}$ at 25° C., 1 bar. This permeability value must not be referred to the properties of the protective polymeric layer per se, but to the polymeric layer containing the auxiliary getter material.

As to the protective layer of hydrogen-permeable polymeric material the following polymers can be used: polysiloxanes such as polydimethylsiloxane, poli(methyl octyl siloxane), polyoxy(dimethyl)silylene, poly(methyl-1-pentenylene), polysiloxanes with hydroxilic or aminic terminations, polysulphones, poly alkanes, among which polyethylenes with different densities, polyether ether ketones, polypyrroles, polyurethanes, polyesters, polycarbonates, polyxylenes.

The polymers mentioned above are preferred for carrying out the invention, because they are compatible with applications having the major constraints in terms of compatibility of the materials employed and being at the same time mostly interesting, i.e. the use in electrochemical devices for energy storage.

Concerning the auxiliary getter material present in the protective polymeric membrane, this may be inserted by way of powders having a grain size not larger than 2 μm. In particular, getter materials having a nanometric size may also be advantageously used, i.e. with a maximum size comprised between 30 nm and 500 nm.

The wording "maximum size" has been used because the shape of the getter particles is typically irregular and not spherical.

Among the auxiliary getter materials suitable for carrying out the invention there are aluminum silicates, with particular reference to molecular sieves or zeolites, also having a modified structure, e.g. by aminic functionalization; oxides of alkaline earth metals; alkaline metal hydroxides, with particular reference to lithium hydroxide, or hydroxides of alkaline earth metals.

As getter materials suitable for the manufacturing of the supporting layer 11 zirconium, yttrium or titanium may be used, among which preferred is the use of titanium. These metals may also contain small amounts of other metal elements that do not significantly alter the characteristics of the supporting layer; typically, the level of these other metals must not exceed 20 wt %.

In a preferred embodiment the palladium or palladium-based composites directly coat the getter support surface that serves as a support for the multilayer system and are therefore in direct contact therewith. In an alternative embodiment it is also possible that an intermediate metallic layer is interposed between the getter material layer and the coating of palladium or palladium-based composites. The function of this layer is to enhance the adhesion of the palladium or palladium-based composites layer, especially when electrochemical deposition processes for the palladium or palladium-based composites are used. Such an intermediate layer is preferably made of Ni, Cu, Pt, and typically has a thickness equal to or lower than 50 nm.

As to the thickness of the layers of the multi-layer composite getter, the thickness of the getter material layer having also the function of support for the improved multi-layer getter system may be comprised between 20 and 500, preferably between 100 and 300 micron (μm). As to the layer of palladium or palladium-based composites, the thickness may be comprised between 10 and 2000 nanometers (nm) and preferably between 20 and 250 nanometers.

As to the thickness of the external layer made of polymeric material, this must be comprised between 1 and 150 μm in order not to compromise the sorption speed of hydrogen by the multi-layer composite getter and to ensure the absence of uncoated areas that might lead to the generation of hydrogen under anomalous operation conditions, i.e. in the presence of currents having reversed polarity.

Anyway, when an auxiliary getter material in a discrete form is used, i.e. in the form of particulate, the thickness of the protective polymeric layer wherein the auxiliary getter material is dispersed must be at least twice the maximum size of the particulate.

In a second aspect thereof the invention relates to a method for the manufacturing of a multi-layer composite getter according to the present invention, wherein the hydrogen-permeable polymeric layer protecting the deposit of the layer of palladium or palladium-based composites is deposited by spin coating, blading, or screen printing by starting from a mixture of the polymer and the auxiliary getter material.

In general, different techniques may be employed in order to deposit the protective polymeric layer containing the auxiliary getter material on the layer of palladium or palladium-based composites. The important aspect associated with these techniques is that they can ensure a sufficient uniformity and regularity of the polymeric layer, in addition to ensure a sufficient adhesion between the layer of palladium or palladium-based composites and the polymeric layer.

Spin coating, blading and screen printing techniques are among the most suitable techniques for the preparation of polymeric deposits having the required characteristics. These techniques are not described herein, since they are widely known by those skilled in the art.

As to the process for the formation of the intermediate layer made of palladium or palladium-based composites, particularly advantageous processes are sputtering, thermal evaporation or evaporation by electron beam, electrochemical deposition processes or, alternatively, chemical deposition processes known in the field as "electroless", which do not require the passage of current, or processes that employ special inks containing palladium or palladium-based composites in solution.

In a third aspect thereof the invention relates to an electrochemical device for energy storage that contains an electrolyte and a multi-layer composite getter according to the present invention.

In this case the protective polymeric layer must be insoluble in the electrolytic solvent and impermeable to the electrolyte and its components.

In a preferred embodiment the permeability to hydrogen of the polymeric layer must be of at least one order of magnitude higher than the permeability to the electrolyte or to its components. Also in this case this property must be referred to the polymeric layer containing the auxiliary getter material.

Particularly interesting devices among the electrochemical devices for energy storage are lithium batteries and electrolytic capacitors, with particular reference to "aluminum capacitors" and "supercapacitors".

Moreover, in this specific application the use of polydimethylsiloxane is very advantageous.

Figure 4:
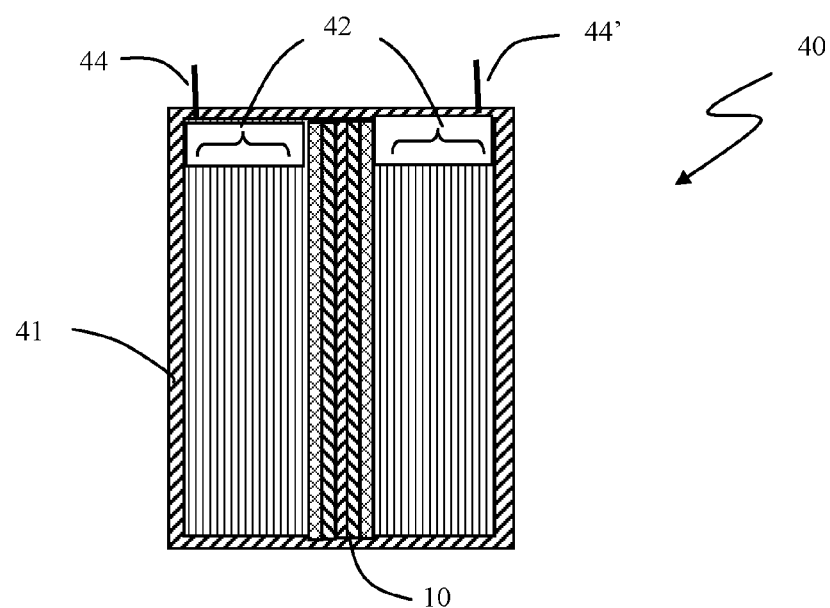
FIG. 4 shows a first embodiment of an electrochemical device for energy storage comprising an improved multi-layer composite getter according to the present invention.

FIG. 4 shows a first way to use an improved multi-layer composite getter 10 within an electrochemical device 40 for energy storage comprising a hermetic container 41 whose electrodes are in the form of thin sheets wound to form a spiral 42, having a sectional view represented by close vertical parallel lines, impregnated with an electrolyte (not shown). The electrical contacts 44, 44' connect the electrodes with the outside of the hermetic container. The improved multi-layer composite getter 10 is arranged in the central portion of this capacitor. The electrochemical device shown in FIG. 4 has a cylindrical geometry, but this geometry is not binding when putting into practice the invention. For example, parallelepiped is another preferred geometric shape for these capacitors having the means for sorbing impurities placed in the central portion of the device.

Figure 5:
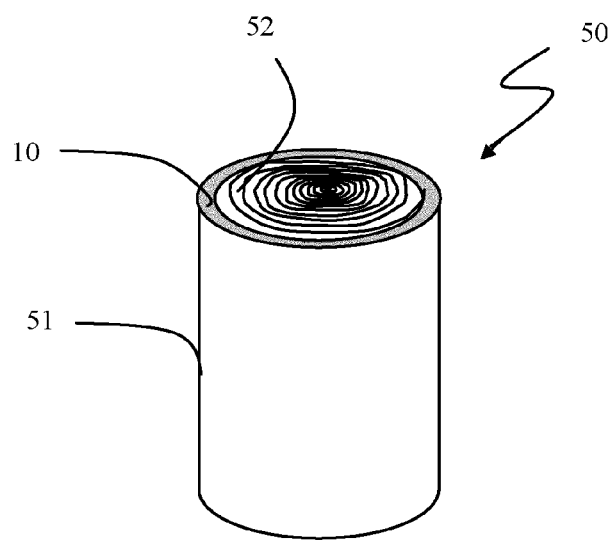
FIG. 5 shows a second embodiment of an electrochemical device for energy storage comprising a multi-layer composite getter according to the present invention.

FIG. 5 shows a second embodiment of an electrochemical device 50 for energy storage. In this case the structure of the device 50 comprises wound electrodes forming a spiral 52 and impregnated with an electrolytic solution (not shown), these components being enclosed in a hermetic container 51. An improved multi-layer composite getter 10 according to the present invention is arranged on one side of this capacitor.

In the embodiment of FIG. 5 the improved multi-layer composite getter is arranged along the whole inner edge of the device, but in a more general embodiment it may also be arranged along a portion only of the device.

Figure 6:
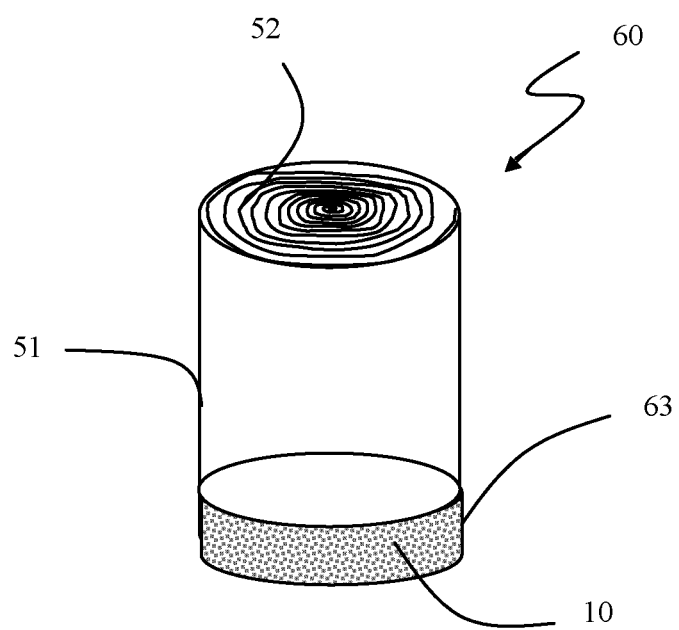
FIG. 6 shows a third embodiment of an electrochemical device for energy storage comprising a multi-layer composite getter according to the present invention.

Moreover, in some particular cases the devices may contain more composite getter elements according to the present invention. For example, these may be present both in the central portion and in the inner periphery of the device. Another very interesting variant is the embodiment of FIG. 6, which shows how the improved multi-layer getter 10 may be arranged in the bottom portion 63 of the hermetic container 51 of the electrochemical device 60.

This embodiment is not restrained to a cylindrical geometry, but may also be employed in other geometries, e.g. prismatic or parallelepiped.

EXAMPLE 1

In order to obtain a 10 w/w % filled membrane on a getter foil (Sample A), 3.0 g of nanozeolites (300 nm particle size) are dispersed in a 21.8 g of a dimethyl siloxane, dimethylvinyl-terminated based resin and the resulting mixture is submitted to a mechanical stirring for 15 minutes. Then a residual pressure of 10-20 mm mercury is applied for 30 minutes in order to promote the material de-airing. Finally 2.2 g of dimethyl, methylhydrogen siloxane are added and the mixture is mechanically mixed for additional 10 minutes.

The mixture is cast-deposited by using an automatic blade on a getter sample having foil shape with both surfaces active towards $H_2$. Their typical size is about 2 cm×5 cm. The metallic getter is a Ti foil 300 micron thick covered on both surfaces by 25 nm of Pd. The polymer protective layer (for sake of simplicity "membrane"), 20 micron thick and containing the auxiliary getter material, covers the whole available surface.

After spreading, the layer is cured at 120° C. for 1 h in order to promote the resin polymerization. Successively, the deposition process is repeated on the second layer of the support and an additional curing step at 120° C. for 1 h is applied. The sample was further annealed in vacuum for 2 hours at 200° C., to consolidate the membrane and exposed to the atmosphere before $H_2$ sorption test. This allows the moisture to fill the membrane, in order to have conservative conditions for the sample (membrane occlusion by atmospheric moisture).

Using instead an amount of 6.6 g of nanozeolites in 26.4 g of resin or 10.8 g in 25.2 g getter foils were analogously obtained with 20 w/w % and 30 w/w % filled membranes on getter foils (respectively Samples B and C)

EXAMPLE 2

In order to obtain a 5 w/w % filled membrane on a getter foil (Sample D), 1.0 g of microzeolites (2 μm particle size) are dispersed in a 19.0 g of a one-past silicone gel and the resulting mixture is submitted to a mechanical stirring for 30 minutes. Then a residual pressure of 10-20 mm Hg is applied for 30 minutes in order to promote the material de-airing.

The mixture is cast-deposited on the first surface of a getter sample. After spreading, the layer is cured at 150° C. for 1 hour in order to promote the resin polymerization. Successively, the deposition process is repeated on the second layer of the support and an additional curing step at 150° C. for 1 h is applied.

Using an amount of 2.0 of zeolites in 18.0 g of gel (and similarly 4.0 g in 16.0 g, 6.0 g in 14.0 g, or 10.0 g in 10.0 g) getter foils were analogously obtained with 10 w/w %, 20 w/w %, 30 w/w % and 50 w/w % filled membranes on getter foils (respectively Samples E, F, G and H )Each Sample (A to H) was singularly mounted into a sorption bench and after short evacuation time (about 1 minute) the sorption test started. The sorption test ran for almost 24 hours. Tests were made at room temperature, at a constant pressure of 8 torr over the samples.

Slope (that is the sorption speed of the getter system at the beginning of the sorption test) and the sorbed hydrogen amount after 24 hours are reported in table 1 for all the samples prepared according to the present invention. The sorption properties in function of the different filling of the membrane show an unexpected maximum value with 20 w/w % concentrations and acceptable value up to 50 w/w % concentrations.

| Sample | Slopes ($10^{-3}$ m$^3$ · Pa · m$^{-2}$ · s$^{-1}$) | Total sorbed amount (after 24 hr) (Pa · m$^3$) |
| --- | --- | --- |
| A (nano 10%) | 13.3 | 1163 |
| B (nano 20%) | 17 | 1519 |
| C (nano 30%) | 9.5 | 1000 |
| D (micro 5%) | 14.4 | 1232 |
| E (micro 10%) | 10.8 | 825 |
| F (micro 20%) | 18.3 | 1512 |
| G (micro 30%) | 15.7 | 1313 |
| H (micro 50%) | 7.8 | 737 |

The invention claimed is:
1. A multi-layer composite getter for hydrogen removal comprising:

a support made predominantly of a metallic getter material, with two surfaces, wherein a layer of palladium or palladium-based composites is provided on at least one of said two surfaces defining a coated surface, wherein a polymeric protective layer permeable to hydrogen is provided on at least 80% of the at least one surface of the coated surface, wherein one or more auxiliary getter materials are embedded within and dispersed throughout said polymeric protective layer permeable to hydrogen with a weight concentration comprised between 5 wt % and 50 wt %, calculated on an overall weight of the polymeric protective layer containing the auxiliary getter materials.

2. The multi-layer composite getter according to claim 1, wherein said weight concentration of auxiliary getter materials is comprised between 15 wt % and 30 wt %.

3. The multi-layer composite getter according to claim 1, wherein said layer of palladium or palladium-based composites is in direct contact with the support.

4. The multi-layer composite getter according to claim 1, further comprising a metallic layer between said layer of palladium or palladium-based composites and said support.

5. The multi-layer composite getter according to claim 1, wherein said layer of palladium or palladium-based composites is provided on both surfaces of the support made predominantly of a metallic getter material.

6. The multi-layer composite getter according to claim 1, wherein said layer of palladium or palladium-based composites is disposed on only one surface of the at least two surfaces of the support made predominantly of metallic getter material.

7. The multi-layer composite getter according to claim 1, wherein said layer of palladium or palladium-based composites covers at least 80% of the at least one of the two surfaces of the coated surface.

8. The multi-layer composite getter according to claim 1, wherein the combination of said polymeric protective layer permeable to hydrogen and the auxiliary getter material embedded within said polymeric protective layer has a hydrogen permeability equal to or higher than $10^{-12}$ $cm^3 cm$ $cm^{-2} s^{-1} Pa^{-1}$ at 25° C., 1 bar.

9. The multi-layer composite getter according to claim 1, wherein said polymeric protective layer permeable to hydrogen is made with polysiloxanes, polysiloxanes with hydroxilic or amminic terminations, polysulphones, poly alkanes, polyether ether ketones, polypyrroles, polyurethanes, polyesters, polycarbonates, or polyxylenes.

10. The multi-layer composite getter according to claim 1, wherein said metallic getter material is made of at least 80% by weight of a metal chosen among zirconium, yttrium, titanium.

11. The multi-layer composite getter according to claim 1, wherein said palladium-based composites comprise at least 60% by weight of palladium and are chosen among Pd—Ag, Pd—Cu, Pd—V, or Pd—Ni.

12. The multi-layer composite getter according to claim 1, wherein a thickness of said support made predominantly of a getter material is comprised between 20 μm and 500 μm.

13. The multi-layer composite getter according to claim 1, wherein a thickness of said layer of palladium or palladium-based composite is comprised between 10 nm and 2000 nm.

14. The multi-layer composite getter according to claim 1, wherein a thickness of said polymeric protective layer permeable to hydrogen is comprised between 1 μm and 150 μm.

15. The multi-layer composite getter according to claim 1, wherein said one or more auxiliary getter materials comprise one or more materials chosen among aluminosilicates, alkaline-earth metal oxides, alkali metal or alkaline-earth metal hydroxides.

16. The multi-layer composite getter according to claim 15, wherein said aluminosilicates include one or more of: molecular sieves or zeolites or functionally modified aluminosilicates.

17. The multi-layer composite getter according to claim 16, wherein said functionally modified aluminosilicates are functionally modified using aminic.

18. The multi-layer composite getter according to claim 15, wherein said alkali metal hydroxides are lithium hydroxides.

19. The multi-layer composite getter according to claim 1, wherein said one or more auxiliary getter materials are used in a discrete form.

20. The multi-layer composite getter according to claim 19, wherein said one or more auxiliary getter materials in discrete form are in a form of particulates having a maximum size of 2 μm.

21. The multi-layer composite getter according to claim 20, wherein a thickness of said protective polymeric layer permeable to hydrogen is at least twice the maximum size of said one or more auxiliary getter materials in form of particulate.

22. The multi-layer composite getter according to claim 19, wherein said one or more auxiliary getter materials in discrete form are in a form of particulates having a maximum dimension between 30 nm and 500 nm.

23. An energy storage electrochemical device containing:
an electrolyte,
a hermetic container, and
one or more multi-layer composite getters according to claim 1, wherein the one or more multi-layer composite getters are enclosed in the hermetic container.

24. The energy storage electrochemical device according to claim 23, wherein said polymeric protective layer permeable to hydrogen is impermeable to the electrolyte.

25. The energy storage electrochemical device according to claim 23, wherein said multi-layer composite getter is arranged in one or more of the following positions of the device: central part of the device, along surface walls of the device, bottom or upper portions of the device.

26. The energy storage electrochemical device according to claim 23, wherein said device is a lithium battery.

27. The energy storage electrochemical device according to claim 23, wherein said device is a supercapacitor.

28. The energy storage electrochemical device according to claim 23, wherein said device is an electrolytic capacitor.

* * * * *